Patented Nov. 27, 1945

2,389,832

UNITED STATES PATENT OFFICE 2,389,832

STORAGE BATTERY

Francis J. Williams, Port Washington, N. Y., and Joseph A. Orsino, Westfield, N. J., assignors to National Lead Company, New York, N. Y., a corporation of New Jersey No Drawing. Application March 19, 1942, Serial No. 435,298

9 Claims. (Cl. 136—6)

This invention relates to storage batteries, more particularly to storage batteries of the lead-acid type and has for its specific object the production of a storage battery with increased efficiency and longer life.

It is known that when certain nickel compounds are added to the active material comprising the negative plate of a storage battery, definite advantages are gained for a time by the deposition of the nickel on the negative plate. Thus, for example, the prior art has disclosed the addition of the nickel salt of lignin sulfonic acid to storage battery negative paste to reduce the voltage at the end of charge as well as the addition of nickelous sulfate to the active material of a storage battery plate. However, these materials of the prior art are quite soluble in the sulfuric acid electrolyte and the entire amount of nickel will immediately go into solution and redeposit upon the negative plate during the first few cycles. During subsequent cycles the nickel becomes buried deep within the negative plate sponge lead and the effect is lost. Moreover, the amounts needed to produce the desired effects are so great that the shelf life of the battery is decreased by the additions.

When a storage battery cell of the lead-acid type is charged, the voltage increases during the charging. The original voltage gradually rises until the cell is completely charged and then approaches a constant value which is dependent upon a number of factors among which are current density, cell temperature, internal resistance, and added ingredients in the grids or active material.

The primary reactions taking place in a storage battery of the lead-acid type are well-known and need not be here repeated. It is well to point out, however, that these reactions are attended by certain undesirable side reactions which, though their exact nature is not entirely understood, are known to be accompanied by the production of gases and high "back" or what are called "end of charge" or "on charge" voltages, particularly during the last stages of charging a battery. The prior art has sought to reduce such end of charge voltage by the use of such metal compounds as nickel sulfate and tellurium sulfate. However, the beneficial results achieved by the use of such compounds were limited and of short duration.

To be effective in decreasing the end of charge voltage the added ingredient must be deposited upon the surface of the negative plate. Most metals when so deposited become buried during several cycles because of the charge and discharge reactions occurring at the plate surface.

It is among the objects of the present invention to supply a material which will continuously maintain a concentration of nickel upon the surface of the negative plate just sufficient to maintain the desired end of charge voltage and do this throughout the life of the battery. It will be remembered that metallic nickel is practically inert in sulfuric acid electrolyte and must be deposited from solution as a fine deposit upon the surface of the negative plate to produce the effect desired.

In order to supply a material which will continuously maintain the concentration of nickel upon the surface of the negative plate of the desired amount, it is necessary to have a continually replenished supply of nickel ions in solution in the electrolyte of the battery. According to the present invention, this is accomplished preferably by introducing into the negative paste of a storage battery a glass containing nickel, such as lead-nickel-silicate, wherein the nickel oxide content is preferably between about 1 and about 25%. When subjected to the leaching action of the acid electrolyte, the nickel-containing glass slowly and continuously gives up nickel ions to the solution thereby insuring a continuous source of nickel ions in the electrolyte solution. By virtue of the aforesaid leaching action, there are also formed some of the elements of a basic nature present in the glass. In the case of lead-nickel-silicate glass, lead sulfate is formed, which in general is not discernible from the lead sulfate normally present in the negative plate of the storage battery.

Another product of this leaching action is possibly a shell or skeleton of silica or silicic acid which, in itself, has no harmful effect on the performance of the negative plate of the storage battery. Another product of this leaching action is some unleached nickel-containing glass or only partially leached nickel-containing glass.

The solubility of nickel ions from a nickel-containing glass may be carefully controlled by altering a number of factors. The finer grinding of the glass prior to its incorporation into the paste produces a larger exposed surface area and consequently increases the solubility of the nickel. The incorporation of lead oxide in the glass or an increase in the amount of lead oxide as, for instance, in a lead-nickel-silicate glass, or a decrease in the amount of silica in the original glass batch will also increase the solubility of the nickel. Various other ingredients may be added to the glass, such as boric acid, borax or compounds producing the alkali oxides in the process of glass manufacture, thereby to increase the solubility of the nickel. In counter-distinction to this, if it is desired to decrease the solubility of the nickel, this may be achieved by increasing the silica content of the glass or by the addition to the glass of oxides such as alumina, titania, lime, zirconia, etc.

In order that the present invention may be more clearly understood, the following specific example is given:

Example I

Twenty pounds of nickel carbonate (equivalent to 11.6 lbs. nickel oxide), 69.7 lbs. litharge and 18.7 lbs. silica were mixed and charged into a small melting furnace comparable to that which is known in the glass industry as a day tank. The melting furnace was heated to about 2300° F. and held at this temperature for 6 hours. At the end of this time the molten glass was tapped from the furnace and quenched by allowing it to run into a tank of water. The quenched glass was dried and ball milled to pass 100 mesh.

One tenth of a pound of this finely divided nickel-lead-silicate glass was mixed with 100 lbs. of a negative storage battery lead oxide blend containing 0.5 pound organic expander, 0.5 pound barium sulfate and 0.25 pound lampblack. Then 5,000 cubic centimeters of water and 3,300 cubic centimeters of sulfuric acid of a specific gravity of 1.250 were added and the mixing continued until the reaction between the litharge and acid was complete.

Another paste was prepared in the same manner but without the addition of nickel-lead-silicate glass and both pastes were used to prepare plates and storage batteries in the usual manner.

When these batteries were charged, it was found that the one containing the nickel-lead-silicate glass in the negative plates had an end of charge voltage 0.42 volt below that of the battery without glass, and that the temperature of this battery containing lead-nickel-silicate glass remained at a lower value by 7° F. than the one not containing the glass. This lower temperature indicates a greater efficiency since more of the electrical energy was utilized to charge the plates and less was wasted as heat. During the life of the battery on the test recommended by the Society of Automotive Engineers, the battery with lead-nickel-silicate glass maintained a constant end of charge voltage whereas the one without glass showed a slowly increasing voltage over 300 cycles of charge and discharge. It is suspected that the reason for this is that the nickel-lead-silicate glass releases nickel ions through a slow solubility and then maintains its effect over the life of the battery. Moreover, the capacity of the battery at low temperatures was improved by the addition of nickel-lead-silicate glass as shown by tests at that time. After 270 charges and discharges the battery with nickel-lead-silicate glass gave 5.28 minutes when discharged at 300 amperes at 0° F. as compared to only 2.52 minutes for the battery without nickel-lead-silicate glass.

While the exact amounts of nickel-containing glass to be incorporated into the oxide mixture to form the improved plate material may vary, amounts between about 0.01% and about 0.50%, preferably between about 0.05% and about 0.10%, based on the weight of the oxide mixture have been found to give highly satisfactory results.

Various modifications of the use of nickel-containing glass in storage batteries to produce the above-mentioned improved results will become apparent to those skilled in the art without departing from the spirit or scope of this invention. For example, the nickel-containing glass may be blown in the form of fibers and incorporated into the usual spun glass separators, or the ground glass may be incorporated into separators, particularly if composition or molded separators are used. Again the ground glass may be incorporated into the mix used for fabricating the battery boxes or containers. In each case the action depends upon the slowly soluble nature of the glass and the fact that small amounts of nickel ions are continually being leached out of the glass into the electrolyte solution.

Having thus described our invention, we claim as new and useful the following:

1. A storage battery of the lead-acid type having incorporated in one of its elements a nickel-containing glass in contact with and soluble in the battery electrolyte.

2. In a storage battery of the lead-acid type, a negative plate containing a lead oxide paste having incorporated therein a small amount of nickel-containing glass soluble in the battery electrolyte.

3. In a storage battery of the lead-acid type, a container having incorporated therein a small amount of a nickel-containing glass in contact with and soluble in the battery electrolyte.

4. In a storage battery of the lead-acid type, a separator having incorporated therein a small amount of nickel-containing glass soluble in the battery electrolyte.

5. A lead oxide active material for plates of storage batteries of the lead-acid type comprising a small amount of a nickel-containing glass soluble in the battery electrolyte.

6. A storage battery according to claim 1 in which the nickel-containing glass is a nickel-lead-silicate glass.

7. A lead oxide active material for plates of storage batteries of the lead-acid type according to claim 5 in which the nickel-containing glass is a nickel-lead-silicate glass.

8. A paste for plates of storage batteries of the lead-acid type comprising lead oxide active material and a small amount of a nickel-containing glass soluble in the battery electrolyte.

9. A paste for plates of storage batteries of the lead-acid type according to claim 8 in which the nickel-containing glass is a nickel-lead-silicate glass.

FRANCIS J. WILLIAMS.
JOSEPH A. ORSINO.